(12) United States Patent
Wang et al.

(10) Patent No.: US 12,526,824 B2
(45) Date of Patent: Jan. 13, 2026

(54) METHOD AND APPARATUS FOR MANAGING MBS SERVICE, TERMINAL DEVICE AND NETWORK DEVICE

(71) Applicant: GUANGDONG OPPO MOBILE TELECOMMUNICATIONS CORP., LTD., Guangdong (CN)

(72) Inventors: Shukun Wang, Dongguan (CN); Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 343 days.

(21) Appl. No.: 18/148,217

(22) Filed: Dec. 29, 2022

(65) Prior Publication Data

US 2023/0137551 A1 May 4, 2023

Related U.S. Application Data

(63) Continuation of application No. PCT/CN2020/115290, filed on Sep. 15, 2020.

(51) Int. Cl.
*H04W 72/30* (2023.01)
*H04W 72/231* (2023.01)

(52) U.S. Cl.
CPC ......... *H04W 72/30* (2023.01); *H04W 72/231* (2023.01)

(58) Field of Classification Search
CPC ..... H04W 4/06; H04W 72/231; H04W 72/30; Y02D 30/70
See application file for complete search history.

(56) References Cited

U.S. PATENT DOCUMENTS

| 2010/0142430 | A1  | 6/2010 | Cho et al. |
| 2016/0242216 | A1* | 8/2016 | Zhao ...................... H04W 76/40 |
| 2016/0249266 | A1* | 8/2016 | Kim ........................ H04W 4/06 |
| 2023/0116092 | A1* | 4/2023 | Wang .................... H04L 1/1685 |
|              |     |        | 370/312 |
| 2023/0299890 | A1* | 9/2023 | Baek ..................... H04W 72/30 |
|              |     |        | 370/329 |

FOREIGN PATENT DOCUMENTS

| CN | 1735057 A   | 2/2006 |
| CN | 102387471 A | 3/2012 |
| CN | 103026642 A | 4/2013 |

(Continued)

OTHER PUBLICATIONS

International Search Report Mailed Jun. 17, 2021 in Application No. PCT/CN2020/115290.

(Continued)

*Primary Examiner* — Srinivasa R Reddivalam
(74) *Attorney, Agent, or Firm* — PERKINS COIE LLP

(57) ABSTRACT

Implementations of the present disclosure provide a method and apparatus for managing an MBS service, a terminal device and a network device. The method includes: a terminal device receives a first command sent by a network device, the first command being used for deactivating at least one MBS service and/or activating at least one MBS service; and according to the first command, the terminal device deactivates the at least one MBS service and/or activates the at least one MBS service.

20 Claims, 3 Drawing Sheets

---

201
A terminal device receives a first command sent by a network device, and the first command is used for deactivating at least one MBS service and/or activating at least one MBS service 202
The terminal device deactivates at least one MBS service and/or activates at least one MBS service based on the first command

(56) References Cited

FOREIGN PATENT DOCUMENTS

WO   2015065053 A1   5/2015
WO   2018143246 A1   8/2018

OTHER PUBLICATIONS

Written Opinion Mailed Jun. 17, 2021 In Application No. PCT/CN2020/115290.
OPPO, MBS_Solution for session deactivation and activation, SA WG2 Meeting #S2-139E, S2-2003857, Jun. 1-12, 2020, Electronic, Elbonia, 5 pages.
LS on RAN impact of FS_5MBS Study, 3GPP TSG-WG SA2 Meeting #140E e-meeting S2-2005415r34, Elbonia, Aug. 19-Sep. 2, 2020 (revision of S2-200xxxx), 3 pages.
Extended European Search Report for European Application No. 20953530.1 Issued Jul. 25, 2023, 8 Pages.
3GPP TSG-RAN2 WG2 Meeting #98 Hangzhou, China; R2-1705296; Source: Huawei; Title: Action upon reception of SC-PTM stop indication, 2 Pages.
First Office Action of the European application No. 20953530.1, issued on Feb. 19, 2024. 7 pages.
First Office action of Chinese application No. 202310679494.X issued on Jun. 19, 2025, 16 pages with English translation.
Second Office Action of the Chinese application No. 202310679494.X, issued on Oct. 29, 2025. 20 pages with English translation.

\* cited by examiner

METHOD AND APPARATUS FOR MANAGING MBS SERVICE, TERMINAL DEVICE AND NETWORK DEVICE

CROSS-REFERENCE TO RELATED APPLICATION

The present application is a continuation application of International PCT Application No. PCT/CN2020/115290, filed on Sep. 15, 2020, the entire content of which is hereby incorporated by reference.

TECHNICAL FIELD

Implementations of the present disclosure relate to the field of mobile communication technologies, in particular to a method and an apparatus for managing a Multimedia Broadcast Service (MBS) service, a terminal device, and a network device.

BACKGROUND

In a New Radio (NR) system, an MBS service does not always exist in a cell. For example, there is no MBS service in a cell for a period of time, but after a period of time, the cell starts to send an MBS service again. From a point of view of a terminal device, after obtaining MBS configuration information, the terminal device will receive an MBS service according to the MBS configuration information, without considering whether the MBS service exists, which leads to a problem of power waste of the terminal device.

SUMMARY

The implementations of the present disclosure provide a method and an apparatus for managing an MBS service, a terminal device, and a network device.

A method for managing an MBS service according to an implementation of the present disclosure includes: receiving, by a terminal device, a first command sent by a network device, wherein the first command is used for deactivating at least one MBS service and/or activating at least one MBS service; and deactivating, by the terminal device, at least one MBS service and/or activating at least one MBS service based on the first command.

A method for managing an MBS service according to an implementation of the present disclosure includes: sending, by a network device, a first command to a terminal device, wherein the first command is used for deactivating at least one MBS service and/or activating at least one MBS service.

An implementation of the present disclosure provides an apparatus for managing an MBS service, which is applied to a terminal device, and the apparatus includes: a receiving unit, configured to receive a first command sent by a network device, wherein the first command is used for deactivating at least one MBS service and/or activating at least one MBS service; and an activating-deactivating unit, configured to deactivate at least one MBS service and/or activate at least one MBS service based on the first command.

An implementation of the present disclosure provides an apparatus for managing an MBS service, which is applied to a network device, and the apparatus includes: a sending unit, configured to send a first command to a terminal device, wherein the first command is used for deactivating at least one MBS service and/or activating at least one MBS service.

An implementation of the present disclosure provides a terminal device, which includes a processor and a memory. The memory is configured to store a computer program, and the processor is configured to call and run the computer program stored in the memory to perform the method for managing an MBS service described above.

An implementation of the present disclosure provides a network device, which includes a processor and a memory. The memory is configured to store a computer program, and the processor is configured to call and run the computer program stored in the memory to perform the method for managing an MBS service described above.

An implementation of the present disclosure provides a chip, which is configured to perform the method for managing an MBS service described above.

Specifically, the chip includes a processor configured to call and run a computer program from a memory to enable a device with the chip installed thereon to perform the method for managing an MBS service described above.

An implementation of the present disclosure provides a computer readable storage medium configured to store a computer program, and the computer program enables a computer to perform the method for managing an MBS service described above.

An implementation of the present disclosure provides a computer program product. The computer program product includes computer program instructions which enable a computer to perform the method for managing an MBS service described above.

An implementation of the present disclosure provides a computer program. When the computer program is run on a computer, the computer is enabled to perform the method for managing an MBS service described above.

A method for managing an MBS service is provided through the above technical solution, wherein a network device indicates at least one deactivated MBS service and/or at least one activated MBS service to a terminal device through a first command. On the one hand, the terminal device deactivates a corresponding MBS service according to the first command, thereby achieving a purpose of saving power of the terminal device in a case of no MBS service; on the other hand, the terminal device activates a corresponding MBS service according to the first command, thereby ensuring that the terminal device can normally receive an MBS service in a case of the presence of the MBS service.

BRIEF DESCRIPTION OF DRAWINGS

Accompanying drawings described herein are intended to provide further understanding of the present disclosure, and constitute a part of the present disclosure. Exemplary implementations of the present disclosure and descriptions thereof are intended to explain the present disclosure, but do not constitute an inappropriate limitation to the present disclosure.

DETAILED DESCRIPTION

Technical solutions in the implementations of the present disclosure will be described below with reference to the accompanying drawings in the implementations of the present disclosure. It is apparent that the implementations described are just a part of the implementations of the present disclosure, rather than all of the implementations of the present disclosure. Based on the implementations of the present disclosure, all other implementations achieved by a person of ordinary skill in the art without making inventive efforts are within the protection scope of the present disclosure.

The technical solutions of the implementations of the present disclosure may be applied to various communication systems, such as a Long Term Evolution (LTE) system, an LTE Frequency Division Duplex (FDD) system, an LTE Time Division Duplex (TDD) system, a system, a 5G system or a future communication system.

Figure 1:
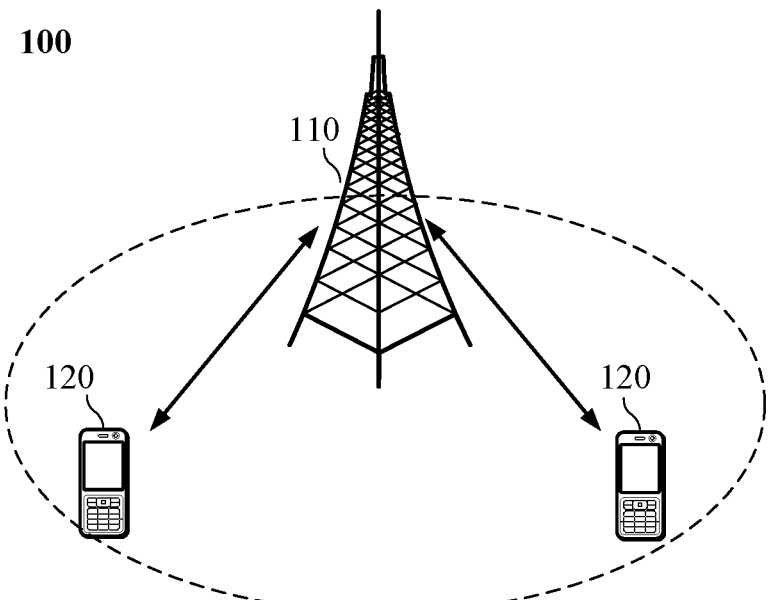
FIG. 1 is a schematic diagram of architecture of a communication system according to an implementation of the present disclosure.

Illustratively, a communication system 100 to which an implementation of the present disclosure is applied is shown in FIG. 1. The communication system 100 may include a network device 110. The network device 110 may be a device that communicates with a terminal 120 (or referred to as a communication terminal, or a terminal). The network device 110 may provide communication coverage for a specific geographical area, and may communicate with a terminal located within the coverage area. Optionally, the network device 110 may be an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal 120 located within the coverage area of the network device 110. The "terminal" as used herein includes, but is not limited to, an apparatus configured to receive/send communication signals via a wired line connection, for example, via a Public Switched Telephone Networks (PSTN), a Digital Subscriber Line (DSL), a digital cable, or a direct cable; and/or another data connection/network; and/or via a wireless interface, for example, for a cellular network, a Wireless Local Area Network (WLAN), a digital television network such as a Digital Video Broadcasting-Handheld (DVB-H) network, a satellite network, or an Amplitude Modulation-Frequency Modulation (AM-FM) broadcast transmitter; and/or another terminal; and/or an Internet of Things (IoT) device. A terminal configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal capable of combining a cellular radio phone with data processing, facsimile, and data communication capabilities; a Personal Digital Assistant (PDA) that may include a radio phone, a pager, internet/intranet access, a Web browser, a memo pad, a calendar, a Global Positioning System (GPS) receiver; and a conventional laptop and/or palmtop receiver or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal in a 5G network, or a terminal in future evolved Public Land Mobile Network (PLMN), etc.

Optionally, Device to Device (D2D) communication may be performed between terminals 120.

Optionally, a 5G communication system or a 5G network may also be referred to as a New Radio (NR) system or an NR network.

FIG. 1 illustrates exemplarily one network device and two terminals. Optionally, the communication system 100 may include a plurality of network devices, and other numbers of terminals may be included within a coverage area of each network device, which is not limited in the implementations of the present disclosure.

Optionally, the communication system 100 may also include another network entity, such as a network controller, a mobile management entity, etc., which is not limited in the implementations of the present disclosure.

It should be understood that a device with a communication function in a network/system in the implementations of the present disclosure may also be referred to as a communication device. Taking the communication system 100 shown in FIG. 1 as an example, communication devices may include a network device 110 and a terminal 120 which have communication functions, and the network device 110 and the terminal 120 may be specific devices described above, and will not be described repeatedly herein. The communication device may further include another device in the communication system 100, such as a network controller, a mobile management entity, and another network entity, which is not limited in the implementations of the present disclosure.

It should be understood that the terms "system" and "network" are often used interchangeably herein. The term "and/or" herein refers to an association relationship describing associated objects only, which indicates that three kinds of relationships may exist, for example, A and/or B may indicate three cases: A alone, both A and B at the same time, and B alone. In addition, the symbol "I" herein generally indicates that objects before and after the symbol "I" have an "or" relationship.

In order to facilitate understanding of the technical solutions of the implementations of the present disclosure, the technical solutions related to the implementations of the present disclosure will be explained below.

With people's pursuit for rate, latency, high-speed mobility, and energy efficiency, and diversity and complexity of services in the future life, therefore, 3rd Generation Partnership Project (3GPP) International Standardization Organization began the research and the development of 5G. Main application scenarios of the 5G are: enhanced Mobile Broadband (eMBB), Ultra-Reliable Low-Latency Communications (URLLC), massive Machine-Type Communication (mMTC).

On one hand, the eMBB still aims at enabling users to obtain multimedia contents, services, and data, and demands thereof are growing very rapidly. On the other hand, because eMBBs may be deployed in different scenarios, such as indoor, an urban district, a rural area, or the like, and differences in their capabilities and demands are also relatively large, which cannot be generalized and must be analyzed in detail in combination with specific deployment scenarios. Typical applications of the URLLC include: industrial automation, power automation, telemedicine operation (surgery), traffic safety guarantee, etc. Typical characteristics of the mMTC include: a high connection density, a small data volume, a latency-insensitive service, a low cost and a long service life of modules, etc.

In an early deployment of the NR, a complete NR coverage is difficult to acquire, so typical network coverage is wide-area LTE coverage and isolated-island NR coverage mode. Moreover, a large amount of LTE deployments are below 6 GHz, and there are few spectrums below 6 GHz which may be used for the 5G. Therefore, spectrum applications above 6 GHz must be studied for the NR, while coverage of the high frequent band is limited, and signal fade of the high frequent band is fast. Meanwhile, in order to protect early investments of mobile operators in LTE, a working mode of tight interworking between LTE and NR is proposed.

MBMS

A Multimedia Broadcast Multicast Service (MBMS) is a technology of transmitting data from one data source to multiple terminal devices through shared network resources. This technology can effectively utilize network resources while providing multimedia services, achieving broadcast and multicast of multimedia services at a relatively high rate (e.g., 256 kbps).

Due to a relatively low spectrum efficiency of an MBMS, it is not enough to effectively carry and support operations of mobile TV services. Therefore, in LTE, 3GPP explicitly proposes to enhance a support capability for a downlink high-speed MBMS service, and determines design requirements for a physical layer and an air interface.

3GPP Release 9 (R9) introduces an evolved MBMS (eMBMS) into LTE. The eMBMS puts forward a concept of a Single Frequency Network (SFN), that is, a Multimedia Broadcast Multicast Service Single Frequency Network (MBSFN). The MBSFN uses a unified frequency to send service data in all cells at the same time, but it must ensure synchronization between cells. This method may greatly improve an overall signal-to-noise ratio distribution of the cells, and spectrum efficiency will be greatly improved accordingly. The eMBMS implements broadcast and multicast of services based on an Internet Protocol (IP) multicast protocol.

In LTE or LTE-Advanced (LTE-A), an MBMS has only a broadcast bearer mode, but no multicast bearer mode. In addition, reception of an MBMS service is applicable to a terminal device in an idle state or a connected state.

A concept of Single Cell Point to Multipoint (SC-PTM) is introduced in 3GPP Release 13 (R13), and the SC-PTM is based on MBMS network architecture.

An MBMS introduces new logical channels, including a Single Cell-Multicast Control Channel (SC-MCCH) and a Single Cell-Multicast Transport Channel (SC-MTCH). The SC-MCCH and the SC-MTCH are mapped onto a Downlink-Shared Channel (DL-SCH), and further, the DL-SCH is mapped onto a Physical Downlink Shared Channel (PDSCH), wherein the SC-MCCH and the SC-MTCH are logical channels, the DL-SCH is a transmission channel, and the PDSCH is a physical channel. The SC-MCCH and the SC-MTCH do not support a Hybrid Automatic Repeat reQuest (HARQ) operation.

The MBMS introduces a new System Information Block (SIB) type, i.e. an SIB20. Specifically, configuration information of the SC-MCCH is transmitted through the SIB20 and there is only one SC-MCCH for a cell. The configuration information of the SC-MCCH includes a modification period of the SC-MCCH, a repetition period of the SC-MCCH, a radio frame and a subframe for scheduling the SC-MCCH, and other information. Further, 1) a boundary of the modification period of the SC-MCCH satisfies SFN mod m=0, wherein SFN represents a system frame number of the boundary, and m is the modification period of the SC-MCCH configured in the SIB20 (i.e. sc-mcch-ModificationPeriod). 2) The radio frame for scheduling the SC-MCCH satisfies: SFN mod mcch-RepetitionPeriod=mcch-Offset, wherein SFN represents a system frame number of the radio frame, mcch-RepetitionPeriod represents a repetition period of the SC-MCCH, and mcch-Offset represents an offset of the SC-MCCH. 3) The subframe for scheduling the SC-MCCH is indicated through sc-mcch-Subframe.

The SC-MCCH is scheduled through a Physical Downlink Control Channel (PDCCH). On one hand, a new Radio Network Temporary Identity (RNTI), namely a Single Cell RNTI (SC-RNTI), is introduced to identify a PDCCH (such as an SC-MCCH PDCCH) used for scheduling the SC-MCCH, and optionally, a fixed value of the SC-RNTI is FFFC. On the other hand, a new RNTI, i.e. a Single Cell Notification RNTI (SC-N-RNTI), is introduced to identify a PDCCH (e.g., a notification PDCCH) for indicating a change notification of the SC-MCCH, and optionally, a fixed value of the SC-N-RNTI is FFFB; further, the change notification may be indicated with one of eight bits of Downlink Control Information (DCI) 1C. In LTE, the configuration information of the SC-PTM is based on the SC-MCCH configured in the SIB20, and then the SC-MCCH configures the SC-MTCH, which is used for transmitting service data.

Specifically, the SC-MCCH transmits only one message (i.e., SCPTMConfiguration), which is used for configuring the configuration information of the SC-PTM. The configuration information of the SC-PTM includes: a Temporary Mobile Group Identity (TMGI), a session Identity (ID), a Group RNTI (G-RNTI), Discontinuous Reception (DRX) configuration information, and SC-PTM service information of a neighbor cell, etc. It should be noted that SC-PTM in R13 does not support a Robust Header Compression (ROHC) function.

Downlink discontinuous reception of SC-PTM is controlled through following parameters: onDurationTimerSCPTM, drx-InactivityTimerSCPTM, SC-MTCH-SchedulingCycle, and SC-MTCH-SchedulingOffset.

A timer onDurationTimerSCPTM is started when [(SFN*10)+subframe number] modulo (SC-MTCH-SchedulingCycle)=SC-MTCH-SchedulingOffset; a timer drx-InactivityTimerSCPTM is started when downlink PDCCH scheduling is received; a downlink SC-PTM service is received only when the timer onDurationTimerSCPTM or drx-InactivityTimerSCPTM runs.

A concept of MBMS service continuity based on an SIB15, that is, a mode "SIB15+MBMSInterestIndication", is adopted for SC-PTM service continuity. Service continuity of a terminal device in an idle state is based on a concept of frequency priority.

In a technical solution of an implementation of the present disclosure, a new SIB (called a first SIB) is defined, the first SIB includes configuration information of a first MCCH, here, the first MCCH is a control channel of an MBMS service, in other words, the first SIB is used for configuring configuration information of a control channel of an NR MBMS, and optionally, the control channel of the NR MBMS may also be called an NR MCCH (i.e. the first MCCH).

Further, the first MCCH is used for carrying a first signaling, and a name of the first signaling is not limited in an implementation of the present disclosure, for example, the first signaling is a signaling A. The first signaling includes configuration information of at least one first MTCH, here, the first MTCH is a service channel of an MBMS service (also called a data channel or a transmission channel), and the first MTCH is used for transmitting MBMS service data (such as NR MBMS service data). In other words, the first MCCH is used for configuring configuration information of a service channel of an NR MBMS, and optionally, the service channel of the NR MBMS may also be referred to as an NR MTCH (i.e. the first MTCH).

Specifically, the first signaling is used for configuring a service channel of an NR MBMS, service information corresponding to the service channel, and scheduling information corresponding to the service channel. Further, optionally, the service information corresponding to the service channel, such as a TMGI, a session id, and other identification information for identifying a service. The scheduling information corresponding to the service channel, such as an RNTI used when MBMS service data corresponding to the service channel is scheduled, such as a G-RNTI and DRX configuration information.

It should be noted that transmission of the first MCCH and the first MTCH is based on PDCCH scheduling. Among them, a unique identify of a whole network is used for an RNTI used by a PDCCH for scheduling the first MCCH, that is, it is a fixed value. The RNTI used by the PDCCH for scheduling the first MTCH is configured through the first MCCH.

It should be noted that naming for the first SIB, the first MCCH, and the first MTCH is not limited in the implementations of the present disclosure. For convenience of description, the first SIB may also be abbreviated as SIB, the first MCCH may also be abbreviated as MCCH, the first MTCH may also be abbreviated as MTCH, a PDCCH for scheduling the MCCH (i.e., a MCCH PDCCH) is configured and notified through the SIB, wherein a PDSCH for transmitting the MCCH (i.e., a MCCH PDSCH) is scheduled through DCI carried by the MCCH PDCCH. Further, M PDCCHs for scheduling the MTCH (i.e., MTCH 1 PDCCH, MTCH 2 PDCCH, . . . , MTCH M PDCCH) are configured through the MCCH, wherein a PDSCH used for transmitting MTCH n (i.e., MTCH N PDSCH) is scheduled through DCI carried by MTCH n PDCCH, and n is an integer greater than or equal to 1 and less than or equal to M. The MCCH and the MTCH are mapped onto a DL-SCH, and further, the DL-SCH is mapped onto a PDSCH, wherein the MCCH and the MTCH are logical channels, the DL-SCH is a transmission channel, and the PDSCH is a physical channel.

It should be noted that the MBMS service in the above solution includes, but is not limited to, a multicast service and a multicast service. Implementations of the present disclosure are illustrated with an MBS service as an example, and description of the "MBS service" may also be replaced with the "multicast service" or the "multicast service" or the "MBMS service".

In an NR MBS service, an MBS service does not always exist in a cell. For example, there is no MBS service in a cell for a period of time, but after a period of time, the cell starts to send an MBS service again. From a point of view of a terminal device, after obtaining MBS configuration information, the terminal device will receive an MBS service according to the MBS configuration information, without considering whether the MBS service exists or not, which bring a problem of power waste to the terminal device. To this end, following technical solutions of the implementations of the present disclosure are proposed.

Figure 2:
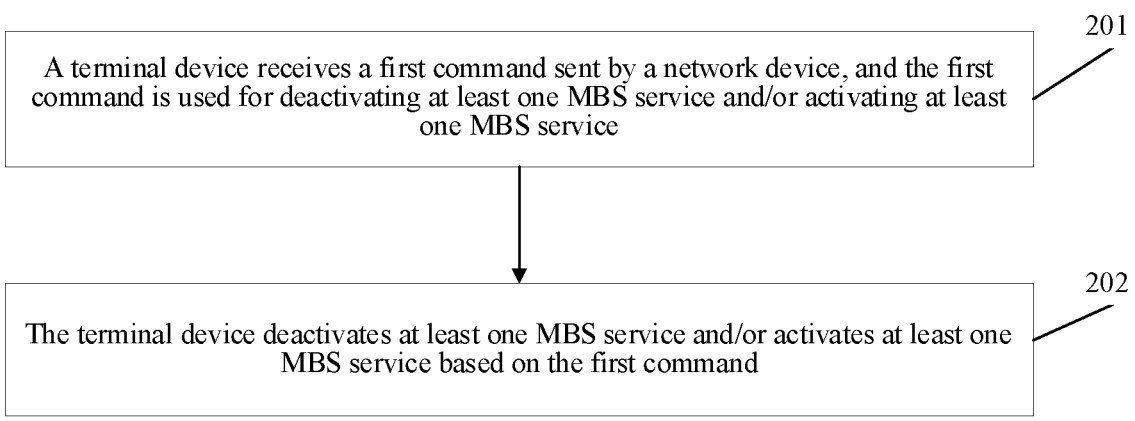
FIG. 2 is a first schematic flowchart of a method for managing an MBS service according to an implementation of the present disclosure.

FIG. 2 is a first schematic flowchart of a method for managing an MBS service according to an implementation of the present disclosure. As shown in FIG. 2, the method or managing an MBS service includes following acts.

In act 201, a terminal device receives a first command sent by a network device, and the first command is used for deactivating at least one MBS service and/or activating at least one MBS service.

In an implementation of the present disclosure, the network device sends the first command to the terminal device, and accordingly, the terminal device receives the first command sent by the network device, wherein the first command is used for deactivating at least one MBS service and/or activating at least one MBS service.

Here, optionally, the network device may be a base station, such as a gNB.

In an optional manner, if a network device side does not have service data of an MBS service (i.e., the network device does not send service data of an MBS service), the network device decides to deactivate the MBS service and sends a first command to the terminal device, wherein the first command is used for deactivating the MBS service. Here, the first command may also be referred to as a command for deactivating the MBS service (simply referred to as a deactivation command).

It should be noted that the above solution is illustrated by taking deactivation of one MBS service as an example, and a situation of multiple MBSs is also applicable, for example, the network device decides to deactivate multiple MBS services and sends a first command to the terminal device, and the first command is used for deactivating the multiple MBS services.

In another optional manner, if service data of an MBS service arrives at the network device side and the MBS service is in a deactivated state, the network device decides to activate the MBS service and sends a first command to the terminal device, and the first command is used for activating the MBS service. Here, the first command may also be referred to as a command for activating the MBS service (simply referred to as an activation command).

It should be noted that the above solution is illustrated by taking activation of one MBS service as an example, and a situation of multiple MBSs is also applicable, for example, the network device decides to activate multiple MBS services and sends a first command to the terminal device, and the first command is used for activating the multiple MBS services.

It should be noted that activating an MBS service may also be understood as activating an MBS session. For example, activating an MBS service may also be understood as activating an MBS session, and activating multiple MBS services may also be understood as activating multiple MBS sessions. For example, deactivating one MBS service may also be understood as deactivating one MBS session, and deactivating multiple MBS services may also be understood as deactivating multiple MBS sessions.

In an implementation of the present disclosure, the first command is carried in Downlink Control Information (DCI), or in a Media Access Control Control Element (MAC CE), or in system broadcast information, or in a dedicated Radio Resource Control (RRC) signaling. Specific implementation of the first command will be described in detail below.

The first command contains an indication of deactivation of one MBS service.

Specifically, the first command is used for deactivating one MBS service, and scheduling information of DCI or a MAC CE carrying the first command is scrambled through a first G-RNTI, which is a G-RNTI corresponding to the MBS service.

In an optional manner, in a case that the first command is carried in DCI, the DCI includes N1-bits indication information, N1 is a positive integer, and the N1-bits indication information is used for indicating to deactivate the MBS service.

For example, a value of N1 is 1, and DCI includes 1-bit indication information. A value of the 1-bit indication information is "1", which is used for indicating to deactivate the MBS service, and the value of the 1-bit indication information is "0", which is used for indicating to activate the MBS service; or, a value of the 1-bitf indication information is "0", which is used for indicating to deactivate the MBS service, and the value of the 1-bit indication information is "1", which is used for indicating to activate the MBS service.

In an optional manner, in a case that the first command is carried in a MAC CE, the MAC CE includes N2-bits indication information, N2 is a positive integer, and the N2-bits indication information is used for indicating to deactivate the MBS service.

For example, a value of N2 is 1, and the MAC CE includes 1-bit indication information. A value of the 1-bit indication information is "1", which is used for indicating to deactivate the MBS service, and the value of the 1-bit indication information is "0", which is used for indicating to activate the MBS service; or, a value of the 1-bit indication information is "0", which is used for indicating to deactivate the MBS service, and the value of the 1-bit indication information is "1", which is used for indicating to activate the MBS service.

In an optional manner, in a case that the first command is carried in a MAC CE, a first Logical Channel Identity (LCID) in a sub-header corresponding to the MAC CE is used for indicating to deactivate the MBS service.

For example, a value of the first LCID in the sub-header corresponding to the MAC CE is a first value, which is used for indicating to deactivate the MBS service, and the value of the first LCID in the sub-header corresponding to the MAC CE is a second value, which is used for indicating to activate the MBS service.

The first command contains an indication of deactivation of one or more MBS services (i.e., at least one MBS service) and/or an indication of activation of one or more MBS services (i.e., at least one MBS service).

A) In an optional manner, the first command is used for deactivating at least one MBS service and/or activating at least one MBS service, and scheduling information of DCI or a MAC CE carrying the first command is scrambled by a first RNTI, which is an RNTI of a first cell. Further, optionally, the first RNTI is configured through system broadcast information of the first cell.

Specifically, the DCI or MAC CE includes a first bitmap, at least one bit in the first bitmap corresponds to at least one MBS service in a first MBS service list one-to-one, and a value of the bit is used for indicating whether an MBS service corresponding to the bit is in an activated state or a deactivated state. Further, optionally, the first MBS service list is configured through system broadcast information of the first cell.

In an example, the system broadcast information of the first cell is configured with an ongoing MBS service list of the first cell (i.e., the first MBS service list), wherein the first MBS service list includes a service identity of at least one MBS service, and a bit in the first bitmap in the MAC CE or DCI corresponds to an MBS service identity in the first MBS service list one-to-one. A value of the bit being 1 indicates that an MBS service indicated by the MBS service identity corresponding to the bit is in an activated state, and a value of the bit being 0 indicates that an MBS service indicated by the MBS service identity corresponding to the bit is in a deactivated state; or, a value of the bit being 0 indicates that an MBS service indicated by the MBS service identity corresponding to the bit is in an activated state, and a value of the bit being 1 indicates that an MBS service indicated by the MBS service identity corresponding to the bit is in a deactivated state.

B) In an optional manner, the first command is used for deactivating at least one MBS service and/or activating at least one MBS service, and scheduling information of DCI or a MAC CE carrying the first command is scrambled by a first Cell RNTI (C-RNTI), which is a C-RNTI of the terminal device.

Specifically, the DCI or MAC CE includes a first bitmap, at least one bit in the first bitmap corresponds to at least one MBS service in a first MBS service list one-to-one, and a value of the bit is used for indicating whether an MBS service corresponding to the bit is in an activated state or a deactivated state. Further, optionally, the first MBS service list is configured through an RRC dedicated signaling.

In an example, the network device configures one or more MBS services (i.e., the first MBS service list) to the terminal device through the RRC dedicated signaling, here, the first MBS service list includes a service identity of at least one MBS service, and a bit in the first bitmap in the MAC CE or DCI corresponds to an MBS service identity in the first MBS service list one-to-one. A value of the bit being 1 indicates that an MBS service indicated by the MBS service identity corresponding to the bit is in an activated state, and a value of the bit being 0 indicates that an MBS service indicated by the MBS service identity corresponding to the bit is in a deactivated state; or, a value of the bit being 0 indicates that an MBS service indicated by the MBS service identity corresponding to the bit is in an activated state, and a value of the bit being 1 indicates that an MBS service indicated by the MBS service identity corresponding to the bit is in a deactivated state.

In the above solution, at least one bit in the first bitmap corresponds to at least one MBS service in the first MBS service list one-to-one, which may be achieved through following manners.

Manner one: at least one MBS service in the first MBS service list with an order of MBS service identity from small to large corresponds to at least one bit in the first bitmap with an order of bit from low to high one-to-one.

Here, optionally, the MBS service identity is a G-RNTI or TMGI.

For example, the MBS service list includes: MBS service identity 1, MBS service identity 2, MBS service identity 3, MBS service identity 4, the first bitmap is "$A_4A_3A_2A_1$", $A_1$ corresponds to MBS service identity 1, $A_2$ corresponds to MBS service identity 2, $A_3$ corresponds to MBS service identity 3, and $A_4$ corresponds to MBS service identity 4. If "$A_4A_3A_2A_1$"="1001", it represents that MBS service 1 indicated by MBS service identity 1 is in an activated state, MBS service 2 indicated by MBS service identity 2 is in a deactivated state, MBS service 3 indicated by MBS service identity 3 is in a deactivated state, and MBS service 4 indicated by MBS service identity 4 is in an activated state.

Manner two: at least one MBS service in the first MBS service list with an order of MBS service identity from large to small corresponds to at least one bit in the first bitmap with an order of bit from low to high one-to-one.

Here, optionally, the MBS service identity is a G-RNTI or TMGI.

For example, the MBS service list includes: MBS service identity 1, MBS service identity 2, MBS service identity 3, MBS service identity 4, the first bitmap is "A4A3A2A1", $A_1$ corresponds to MBS service identity 4, $A_2$ corresponds to MBS service identity 3, $A_3$ corresponds to MBS service identity 2, and $A_4$ corresponds to MBS service identity 1. If "$A_4A_3A_2A_1$"="1011", it represents that MBS service 1 indicated by MBS service identity 1 is in an activated state, MBS service 2 indicated by MBS service identity 2 is in a deactivated state, MBS service 3 indicated by MBS service identity 3 is in an activated state, and MBS service 4 indicated by MBS service identity 4 is in an activated state.

Optionally, prior to the act 201, the method further includes: the network device transmits MBS configuration information to the terminal device, and accordingly, the terminal device receives the MBS configuration information transmitted by the network device, wherein the MBS configuration information is used for determining at least one of following.

1) MBS service identity.

Here, optionally, the MBS service identity includes at least one of following: a TMGI, an MBS session identity, and a G-RNTI. Among them, the G-RNTI is used for scrambling scheduling information of an MBS service.

2) A first Time Division Multiplexing (TDM) pattern configuration used for determining a time of receiving an MBS service and a time of receiving a unicast service.

Here, the terminal device may determine which time period is used for receiving the MBS service and which time period is used for receiving the unicast service according to the first TDM pattern configuration. The terminal device receives an MBS service on an MBS BandWidth Part (BWP) and a unicast service on a unicast BWP, so that the terminal device may determine when it is on the MBS BWP and when it is on the unicast BWP according to the first TDM pattern configuration, thereby achieving switching between the MBS BWP and the unicast BWP.

3) A first timer used for determining a time to switch to an MBS BWP.

Here, when the terminal device starts receiving a unicast service on a unicast BWP, the first timer is started. If the first timer expires, the unicast BWP is switched to the MBS BWP.

4) An MBS receiving time length used for determining a time length for receiving an MBS service by the terminal device.

Here, the MBS receiving time length is used for indicating the time length for the terminal device to receive the MBS service.

5) An MBS Control Resource Set (CORESET) which is a CORESET corresponding to an MBS service.

Here, the terminal device monitors a PDCCH corresponding to the MBS service on the MBS CORESET.

6) An MBS searchspace which is a searchspace corresponding to an MBS service.

Here, the terminal device monitors a PDCCH corresponding to the MBS service on the MBS searchspace.

7) An MBS BWP which is a BWP corresponding to an MBS service.

Here, the terminal device receives the MBS service on the MBS BWP.

It should be noted that the MBS configuration information is used for determining configuration information of one MBS service, but it is not limited to this, and the network device may also configure configuration information of multiple MBS services to the terminal device. Contents contained in configuration information of each MBS service may refer to contents in the above solution.

In act 202, the terminal device deactivates at least one MBS service and/or activates at least one MBS service based on the first command.

In an implementation of the present disclosure, for an MBS service in a deactivated state, the terminal device executes at least one of following operations.

Operation 1: stopping monitoring a first PDCCH, wherein the first PDCCH is a PDCCH scrambled by a G-RNTI corresponding to the MBS service.

Here, if an MBS service is in a deactivated state, the terminal device stops monitoring a PDCCH scrambled by a G-RNTI of the MBS service.

Specifically, the terminal device stops monitoring the first PDCCH in an MBS CORESET and/or an MBS searchspace, wherein the MBS CORESET is a CORESET corresponding to the MBS service, and the MBS searchspace is a searchspace corresponding to the MBS service.

Operation 2: not switching to an MBS BWP, wherein the MBS BWP is a BWP corresponding to the MBS service.

Operation 3: stopping a first timer for triggering switching of the MBS BWP.

Here, if the MBS service is in a deactivated state and switching of the MBS BWP depends on the first timer, the terminal device stops the first timer.

Operation 4: ignoring a first TDM pattern configuration used for triggering switching of the MBS BWP.

Here, if the MBS service is in a deactivated state and the switching of the MBS BWP depends on the first TDM pattern configuration pre-configured by a network, the terminal device ignores the first TDM pattern configuration.

Figure 3:
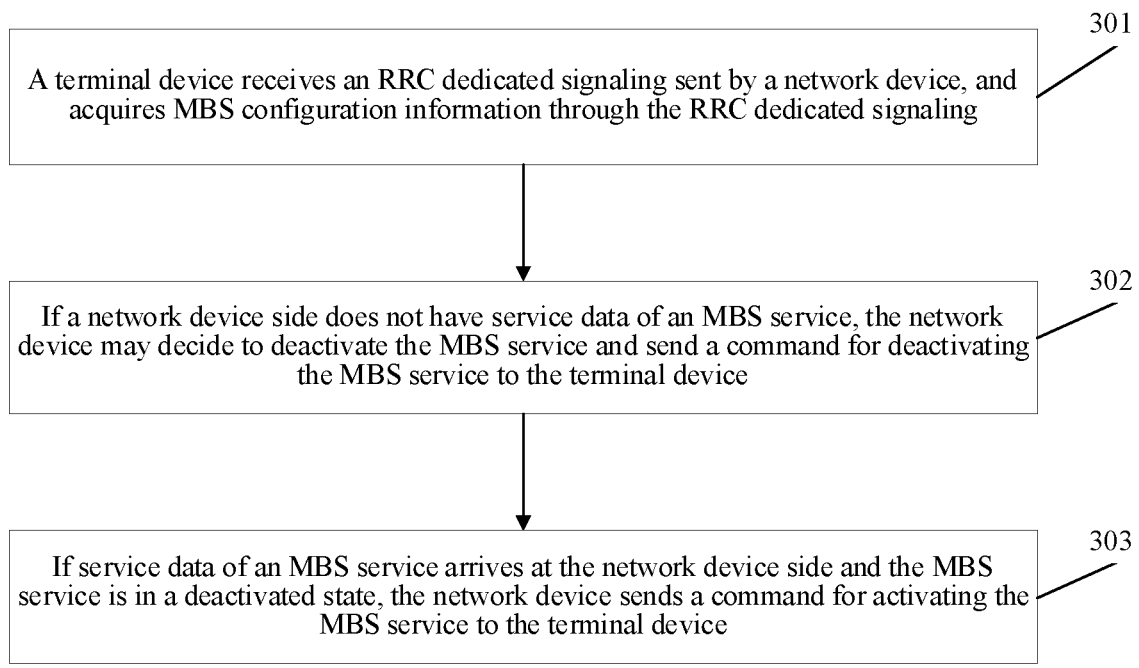
FIG. 3 is a second schematic flowchart of a method for managing an MBS service according to an implementation of the present disclosure.

FIG. 3 is a second schematic flowchart of a method for managing an MBS service according to an implementation of the present disclosure. As shown in FIG. 3, the method for managing the MBS service includes following acts.

In act 301, a terminal device receives an RRC dedicated signaling sent by a network device, and acquires MBS configuration information through the RRC dedicated signaling.

Here, the terminal device supports an MBS service.

Here, the terminal device acquires the MBS configuration information sent by the network device through the RRC dedicated signaling, wherein the MBS configuration information includes at least one of following: an MBS service identity, a first TDM pattern configuration, information of a first timer, an MBS receiving time length, configuration information of an MBS CORESET, configuration information of an MBS searchspace, and configuration information of an MBS BWP.

In act 302, if a network device side does not have service data of an MBS service, the network device may decide to deactivate the MBS service and send a command for deactivating the MBS service to the terminal device.

Here, the command for deactivating the MBS service may refer to the aforementioned description of the "first command".

Here, if the MBS service is in a deactivated state, the terminal device has at least one of following behaviors (i.e., operations).

Operation 1: stopping monitoring a first PDCCH, wherein the first PDCCH is a PDCCH scrambled by a G-RNTI corresponding to the MBS service.

Operation 2: not switching to an MBS BWP, wherein the MBS BWP is a BWP corresponding to the MBS service.

Operation 3: stopping a first timer for triggering switching of the MBS BWP.

Operation 4: ignoring a first TDM pattern configuration used for triggering switching of the MBS BWP.

In act 303, if service data of an MBS service arrives at the network device side and the MBS service is in a deactivated state, the network device sends a command for activating the MBS service to the terminal device.

Here, the command for activating the MBS service may refer to the aforementioned description of the "first command".

Figure 4:
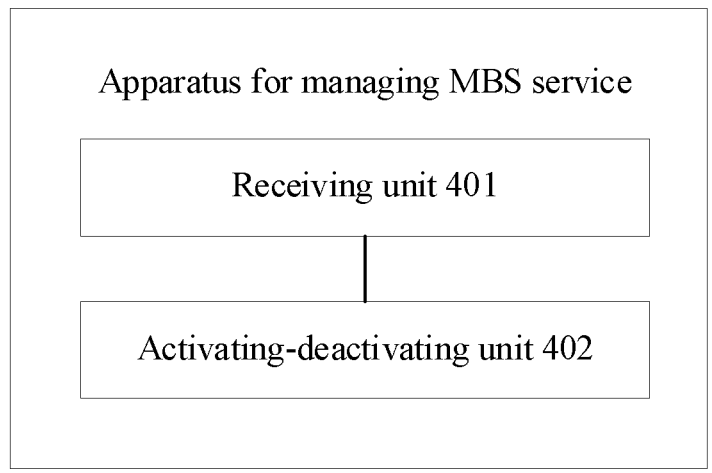
FIG. 4 is a first schematic diagram of structure composition of an apparatus for managing an MBS service according to an implementation of the present disclosure.

FIG. 4 is a first schematic diagram of structure composition of an apparatus for managing an MBS service according to an implementation of the present disclosure, which is applied to a terminal device. As shown in FIG. 4, the apparatus for managing the MBS service includes: a receiving unit 401, configured to receive a first command sent by a network device, wherein the first command is used for deactivating at least one MBS service and/or activating at least one MBS service; and an activating-deactivating unit 402, configured to deactivate at least one MBS service and/or activate at least one MBS service based on the first command.

In an optional manner, the first command is carried in DCI, or in a MAC CE, or in system broadcast information, or in an RRC signaling.

In an optional manner, the first command is used for deactivating an MBS service, and scheduling information of DCI or a MAC CE carrying the first command is scrambled through a first G-RNTI, which is a G-RNTI corresponding to the MBS service.

In an optional manner, in a case that the first command is carried in DCI, the DCI includes N1-bits indication information, N1 is a positive integer, and the N1-bits indication information is used for indicating to deactivate the MBS service.

In an optional manner, in a case that the first command is carried in a MAC CE, the MAC CE includes N2-bits indication information, N2 is a positive integer, and the N2-bits indication information is used for indicating to deactivate the MBS service; or, a first LCID in a sub-header corresponding to the MAC CE is used for indicating to deactivate the MBS service.

In an optional manner, the first command is used for deactivating at least one MBS service and/or activating at least one MBS service. Scheduling information of DCI or a MAC CE carrying the first command is scrambled through a first RNTI or a first C-RNTI, wherein the first RNTI is an RNTI of a first cell and the first C-RNTI is a C-RNTI of the terminal device.

In an optional manner, the DCI or MAC CE includes a first bitmap, at least one bit in the first bitmap corresponds to at least one MBS service in a first MBS service list one-to-one, and a value of the bit is used for indicating whether an MBS service corresponding to the bit is in an activated state or a deactivated state.

In an optional manner, the first MBS service list and/or the first RNTI are configured through system broadcast information of the first cell in a case that scheduling information of the DCI or MAC CE carrying the first command is scrambled through the first RNTI.

In an optional manner, the first MBS service list is configured through an RRC dedicated signaling in a case that scheduling information of DCI or MAC CE carrying the first command is scrambled through the first C-RNTI.

In an optional manner, at least one bit in the first bitmap corresponds to at least one MBS service in the first MBS service list one-to-one, including:

at least one MBS service in the first MBS service list with an order of MBS service identity from small to large corresponds to at least one bit in the first bitmap with an order of bit from low to high one-to-one; or, at least one MBS service in the first MBS service list with an order of MBS service identity from large to small corresponds to at least one bit in the first bitmap with an order of bit from low to high one-to-one.

In an optional manner, the MBS service identity is a G-RNTI or TMGI.

In an optional manner, the apparatus further includes: an execution unit (not shown in the figure), configured to execute at least one of following operations for an MBS service in a deactivated state: stopping monitoring a first PDCCH, wherein the first PDCCH is a PDCCH scrambled by a G-RNTI corresponding to the MBS service; not switching to an MBS BWP, wherein the MBS BWP is a BWP corresponding to the MBS service; stopping a first timer, wherein the first timer is used for triggering switching of an MBS BWP; ignoring a first TDM pattern configuration, wherein the first TDM pattern configuration is used for triggering switching of an MBS BWP.

In an optional manner, the execution unit is configured to: stop monitoring a first PDCCH in an MBS control resource set CORESET and/or an MBS searchspace, wherein the MBS CORESET is a CORESET corresponding to the MBS service, and the MBS searchspace is a searchspace corresponding to the MBS service.

In an optional manner, the receiving unit 401 is further configured to receive MBS configuration information sent by the network device, and the MBS configuration information is used for determining at least one of following: an MBS service identity; a first TDM pattern configuration used for determining a time of receiving an MBS service and a time of receiving a unicast service; a first timer used for determining a time to switch to an MBS BWP; an MBS receiving time length used for determining a time length for receiving an MBS service by the terminal device; an MBS CORESET which is a CORESET corresponding to an MBS service; an MBS searchspace which is a searchspace corresponding to an MBS service; an MBS BWP which is a BWP corresponding to an MBS service.

In an optional manner, the MBS service identity includes at least one of following: a TMGI, an MBS session identity, and a G-RNTI.

Those skilled in the art should understand that relevant description of the apparatus for managing the MBS service according to an implementation of the present disclosure may be understood with reference to relevant description of the method for managing the MBS service according to an implementation of the present disclosure.

Figure 5:
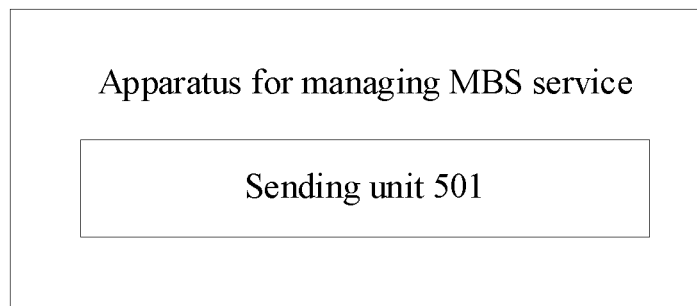
FIG. 5 is a second schematic diagram of structure composition of an apparatus for managing an MBS service according to an implementation of the present disclosure.

FIG. 5 is a second schematic diagram of structure composition of an apparatus for managing an MBS service according to an implementation of the present disclosure, which is applied to a network device. As shown in FIG. 5, the apparatus for managing the MBS service includes: a sending unit 501, configured to send a first command to a terminal device, wherein the first command is used for deactivating at least one MBS service and/or activating at least one MBS service.

In an optional manner, the first command is carried in DCI, or in a MAC CE, or in system broadcast information, or in an RRC signaling.

In an optional manner, the first command is used for deactivating an MBS service, and scheduling information of DCI or a MAC CE carrying the first command is scrambled through a first G-RNTI, which is a G-RNTI corresponding to the MBS service.

In an optional manner, in a case that the first command is carried in DCI, the DCI includes N1-bits indication information, N1 is a positive integer, and the N1-bits indication information is used for indicating to deactivate the MBS service.

In an optional manner, in a case that the first command is carried in a MAC CE, the MAC CE includes N2-bits indication information, N2 is a positive integer, and the N2-bits indication information is used for indicating to deactivate the MBS service; or, a first LCID in a sub-header corresponding to the MAC CE is used for indicating to deactivate the MBS service.

In an optional manner, the first command is used for deactivating at least one MBS service and/or activating at least one MBS service. Scheduling information of DCI or a MAC CE carrying the first command is scrambled through a first RNTI or a first C-RNTI, wherein the first RNTI is an RNTI of a first cell and the first C-RNTI is a C-RNTI of the terminal device.

In an optional manner, the DCI or MAC CE includes a first bitmap, at least one bit in the first bitmap corresponds to at least one MBS service in a first MBS service list one-to-one, and a value of the bit is used for indicating whether an MBS service corresponding to the bit is in an activated state or a deactivated state.

In an optional manner, the first MBS service list and/or the first RNTI are configured through system broadcast information of the first cell in a case that scheduling information of the DCI or MAC CE carrying the first command is scrambled through the first RNTI.

In an optional manner, the first MBS service list is configured through an RRC dedicated signaling in a case that scheduling information of DCI or MAC CE carrying the first command is scrambled through the first C-RNTI.

In an optional manner, at least one bit in the first bitmap corresponds to at least one MBS service in the first MBS service list one-to-one, including: at least one MBS service in the first MBS service list with an order of MBS service identity from small to large corresponds to at least one bit in the first bitmap with an order of bit from low to high one-to-one; or, at least one MBS service in the first MBS service list with an order of MBS service identity from large to small corresponds to at least one bit in the first bitmap with an order of bit from low to high one-to-one.

In an optional manner, the MBS service identity is a G-RNTI or TMGI.

In an optional manner, the sending unit 501 is further configured to send MBS configuration information to the terminal device, and the MBS configuration information is used for determining at least one of following: an MBS service identity; a first TDM pattern configuration used for determining a time of receiving an MBS service and a time of receiving a unicast service; a first timer used for determining a time to switch to an MBS BWP; an MBS receiving time length used for determining a time length for receiving an MBS service by the terminal device; an MBS CORESET which is a CORESET corresponding to an MBS service; an MBS searchspace which is a searchspace corresponding to an MBS service; an MBS BWP which is a BWP corresponding to an MBS service.

In an optional manner, the MBS service identity includes at least one of following: a TMGI, an MBS session identity, and a G-RNTI.

Those skilled in the art should understand that relevant description of the apparatus for managing the MBS service of an implementation of the present disclosure may be understood with reference to relevant description of the method for managing the MBS service of the implementations of the present disclosure.

Figure 6:
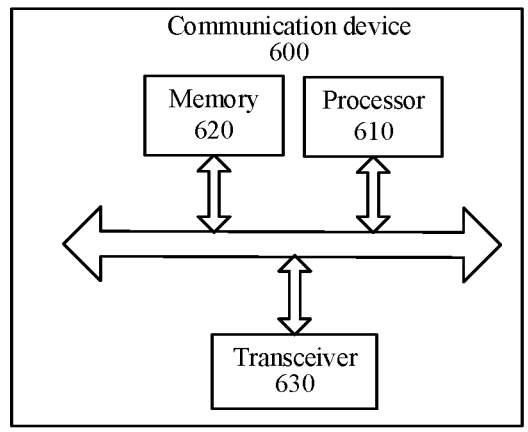
FIG. 6 is a schematic structure diagram of a communication device according to an implementation of the present disclosure.

FIG. 6 is a schematic structure diagram of a communication device 600 according to an implementation of the present disclosure. The communication device may be a terminal device or a network device. The communication device 600 shown in FIG. 6 includes a processor 610, which may call and run a computer program from a memory to implement the method in the implementations of the present disclosure.

Optionally, as shown in FIG. 6, the communication device 600 may further include a memory 620. The processor 610 may invoke and run a computer program from the memory 620 to implement any of the methods in the implementations of the present disclosure.

The memory 620 may be a separate device independent of the processor 610, or may be integrated in the processor 610.

Optionally, as shown in FIG. 6, the communication device 600 may further include a transceiver 630, and the processor 610 may control the transceiver 630 to communicate with another device. Specifically, the transceiver 630 may send information or data to another device or receive information or data sent by another device.

The transceiver 630 may include a transmitter and a receiver. The transceiver 630 may further include antennas, a quantity of which may be one or more.

Optionally, the communication device 600 may specifically be the network device according to the implementations of the present disclosure, and the communication device 600 may implement corresponding processes implemented by the network device in various methods in the implementations of the present disclosure, which will not be repeated here for brevity.

Optionally, the communication device 600 may specifically be the mobile terminal/terminal device in accordance with the implementations of the present disclosure, and the communication device 600 may implement the corresponding processes implemented by the mobile terminal/terminal device in various methods in the implementations of the present disclosure, which will not be repeated herein for brevity.

Figure 7:
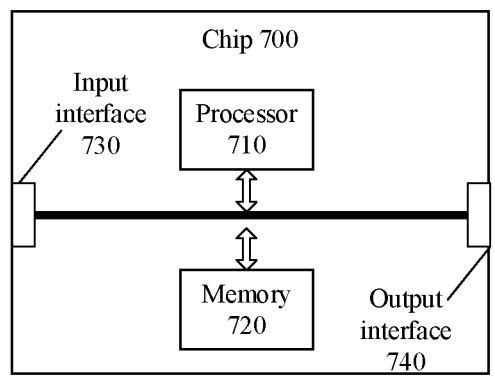
FIG. 7 is a schematic structure diagram of a chip according to an implementation of the present disclosure.

FIG. 7 is a schematic diagram of a structure of a chip according to an implementation of the present disclosure. The chip 700 shown in FIG. 7 includes a processor 710, wherein the processor 710 may call and run a computer program from a memory to implement a method in an implementation of the present disclosure.

Optionally, as shown in FIG. 7, the chip 700 may further include a memory 720. The processor 710 may invoke and run a computer program from the memory 720 to implement any of the methods in the implementations of the present disclosure.

The memory 720 may be a separate device independent of the processor 710, or may be integrated in the processor 710.

Optionally, the chip 700 may further include an input interface 730. The processor 710 may control the input interface 730 to communicate with another device or chip. Specifically, the processor 710 may acquire information or data sent by another device or chip.

Optionally, the chip 700 may further include an output interface 740. The processor 710 may control the output interface 740 to communicate with another device or chip. Specifically, the processor 710 may output information or data to another device or chip.

Optionally, the chip may be applied to the network device in the implementations of the present disclosure, and the chip may implement the corresponding processes implemented by the network device in the various methods of the implementations of the present disclosure, which will not be repeated here for brevity.

Optionally, the chip may be applied to the mobile terminal/terminal device in the implementations of the present disclosure, and the chip may implement corresponding processes implemented by the mobile terminal/terminal device in various methods of the implementations of the present disclosure, which will not be repeated herein for brevity.

It should be understood that the chip mentioned in the implementations of the present disclosure may also be referred to as a system-level chip, a system chip, a chip system, or a system on chip, etc.

Figure 8:
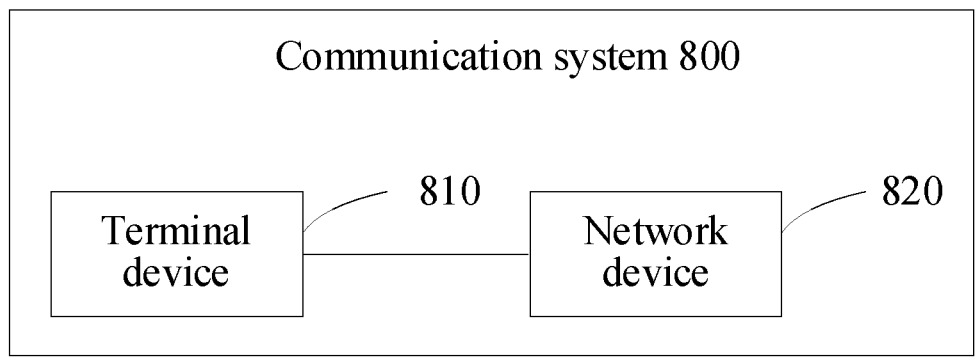
FIG. 8 is a schematic block diagram of a communication system according to an implementation of the present disclosure.

FIG. 8 is a schematic block diagram of a communication system 800 in accordance with an implementation of the present disclosure. As shown in FIG. 8, the communication system 800 includes a terminal device 810 and a network device 820.

The terminal device 810 may be configured to implement the corresponding functions implemented by the terminal device in the above-mentioned methods, and the network device 820 may be configured to implement the corresponding functions implemented by the network device in the above-mentioned methods, which will not be repeated herein for brevity.

It should be understood that the processor in the implementations of the present disclosure may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present disclosure. The general purpose processor may be a microprocessor or the processor may be any conventional processor. The acts of the methods disclosed in connection with the implementations of the present disclosure may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the implementations of the present disclosure may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that the above memories are described as examples rather than limitations. For example, the memory in the implementations of the present disclosure may be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM) and a direct Rambus RAM (DR RAM), etc. That is to say, the memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied to the network device in the implementations of the present disclosure, and the computer program causes a computer to perform the corresponding processes implemented by the network device in various methods in accordance with the implementations of the present disclosure, which will not be repeated herein for brevity.

Optionally, the computer readable storage medium may be applied to the mobile terminal/terminal device in the implementations of the present disclosure, and the computer program causes a computer to perform the corresponding processes implemented by the mobile terminal/terminal device in various methods in accordance with the implementations of the present disclosure, which will not be repeated herein for brevity.

An implementation of the present disclosure further provides a computer program product, including computer program instructions.

Optionally, the computer program product may be applied to the network device in the implementations of the present disclosure, and the computer program instructions cause a computer to perform the corresponding processes implemented by the network device in various methods in accordance with the implementations of the present disclosure, which will not be repeated herein for brevity.

Optionally, the computer program product may be applied to the mobile terminal/terminal device in the implementations of the present disclosure, and the computer program instructions cause a computer to perform the corresponding processes implemented by the mobile terminal/terminal device in various methods in accordance with the implementations of the present disclosure, which will not be repeated herein for brevity.

An implementation of the present disclosure further provides a computer program.

Optionally, the computer program may be applied to the network device in the implementations of the present disclosure. When the computer program is run on a computer, the computer is enabled to perform corresponding processes implemented by the network device in various methods according to the implementations of the present disclosure, which will not be repeated here for brevity.

Optionally, the computer program may be applied to the mobile terminal/terminal device in the implementations of the present disclosure. The computer program, when running on a computer, causes the computer to perform the corresponding processes implemented by the mobile terminal/terminal device in various methods in accordance with the implementations of the present disclosure, which will not be repeated herein for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present disclosure.

Those skilled in the art may clearly understand that for convenience and conciseness of description, specific working processes of the systems, apparatuses, and units described above may refer to corresponding processes in the aforementioned method implementations, and details will not be repeated here.

In several implementations according to the present disclosure, it should be understood that the disclosed systems, apparatuses, and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

The units described as separate components may be or may be not physically separated, and the component shown as a unit may be or may be not a physical unit, i.e., it may be located in one place or may be distributed on multiple network units. Part or all of units may be selected according to actual needs to achieve purposes of technical solutions of the implementations.

In addition, various functional units in various implementations of the present disclosure may be integrated in one processing unit, or various units may be physically present separately, or two or more units may be integrated in one unit.

The functions, if implemented in a form of software functional units and sold or used as an independent product, may be stored in a computer readable storage medium. Based on such understanding, the technical solutions of the present disclosure, in essence, or parts of them which contribute to the prior art, or parts of the technical solutions, may be embodied in a form of a software product, which is stored in a storage medium, and includes several instructions for enabling a computer device (which may be a personal computer, a server, or a network device, etc.) to perform all or part of the acts of the methods of various implementations of the present disclosure. And the aforementioned storage medium includes various media, such as a U disk, a mobile hard disk, a Read-Only Memory (ROM), a Random Access Memory (RAM), a magnetic disk, or an optical disk, etc., which may store program codes.

The foregoing are merely specific implementations of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure shall be subject to the protection scope of the claims.

The invention claimed is:

1. A method for managing a Multimedia Broadcast Service (MBS) service, comprising:
   receiving, by a terminal device, a first command sent by a network device, wherein the first command is used for deactivating at least one MBS service and/or activating at least one MBS service; and
   deactivating, by the terminal device, at least one MBS service and/or activating at least one MBS service based on the first command; wherein the method further comprises:
   for an MBS service in a deactivated state, executing, by the terminal device, following operations:
   stopping monitoring a first Physical Downlink Control Channel (PDCCH), wherein the first PDCCH is a PDCCH scrambled by a Group Radio Network Temporary Identity (G-RNTI) corresponding to the MBS service;
   not switching to an MBS BandWidth Part (BWP), wherein the MBS BWP is a BWP corresponding to the MBS service;
   stopping a first timer, wherein the first timer is used for triggering switching of the MBS BWP; and
   ignoring a first Time Division Multiplexing (TDM) pattern configuration, wherein the first TDM pattern configuration is used for triggering switching of the MBS BWP.

2. The method of claim 1, wherein the first command is carried in Downlink Control Information (DCI), or in a Media Access Control Control Element (MAC CE);
   wherein in a case that the first command is carried in DCI, the DCI comprises N1-bits indication information, N1 is a positive integer, the N1-bits indication information is used for indicating to deactivate the MBS service;

wherein in a case that the first command is carried in a MAC CE, the MAC CE comprises N2-bits indication information, N2 is a positive integer, and the N2-bits indication information is used for indicating to deactivate the MBS service; or, a first Logical Channel Identity (LCID) in a sub-header corresponding to the MAC CE is used for indicating to deactivate the MBS service.

3. The method of claim 1, wherein stopping monitoring the first PDCCH, comprises:

stopping monitoring the first PDCCH in an MBS Control Resource Set (CORESET) and/or an MBS searchspace, wherein the MBS CORESET is a CORESET corresponding to the MBS service, and the MBS searchspace is a searchspace corresponding to the MBS service.

4. The method of claim 1, further comprising:

receiving, by the terminal device, MBS configuration information sent by the network device, wherein the MBS configuration information is used for determining following:

an MBS service identity;

an MBS Control Resource Set (CORESET), which is a CORESET corresponding to an MBS service;

an MBS searchspace, which is a searchspace corresponding to an MBS service;

an MBS BWP, which is a BWP corresponding to an MBS service;

a first Time Division Multiplexing (TDM) pattern configuration, which is used for determining a time of receiving an MBS service and a time of receiving a unicast service;

a first timer, which is used for determining a time to switch to an MBS BandWidth Part (BWP); and an MBS receiving time length, which is used for determining a time length for receiving an MBS service by the terminal device.

5. The method of claim 4, wherein the MBS service identity comprises at least one of following: a Temporary Mobile Group Identity (TMGI), an MBS session identity, and a Group Radio Network Temporary Identity (G-RNTI).

6. The method of claim 2, wherein the DCI or MAC CE comprises a first bitmap, at least one bit in the first bitmap corresponds to at least one MBS service in a first MBS service list one-to-one, and a value of the bit is used for indicating whether an MBS service corresponding to the bit is in an activated state or a deactivated state;

wherein at least one bit in the first bitmap corresponds to at least one MBS service in the first MBS service list one-to-one, comprising:

at least one MBS service in the first MBS service list with an order of MBS service identity from small to large corresponds to at least one bit in the first bitmap with an order of bit from low to high one-to-one; or, at least one MBS service in the first MBS service list with an order of MBS service identity from large to small corresponds to at least one bit in the first bitmap with an order of bit from low to high one-to-one.

7. The method of claim 6, wherein the first MBS service list and/or the first RNTI are configured through system broadcast information of the first cell in a case that the scheduling information of the DCI or MAC CE carrying the first command is scrambled through the first RNTI; or, wherein the first MBS service list is configured through an RRC dedicated signaling in a case that the scheduling information of the DCI or MAC CE carrying the first command is scrambled through the first C-RNTI.

8. A method for managing a Multimedia Broadcast Service (MBS) service, comprising:

sending, by a network device, a first command to a terminal device, wherein the first command is used for deactivating at least one MBS service and/or activating at least one MBS service; wherein the method further comprises:

for an MBS service in a deactivated state, the first command is used for the terminal device to perform following operations:

stopping monitoring a first Physical Downlink Control Channel (PDCCH), wherein the first PDCCH is a PDCCH scrambled by a Group Radio Network Temporary Identity (G-RNTI) corresponding to the MBS service;

not switching to an MBS BandWidth Part (BWP), wherein the MBS BWP is a BWP corresponding to the MBS service;

stopping a first timer, wherein the first timer is used for triggering switching of the MBS BWP; and ignoring a first Time Division Multiplexing (TDM) pattern configuration, wherein the first TDM pattern configuration is used for triggering switching of the MBS BWP.

9. The method of claim 8, wherein the first command is carried in Downlink Control Information (DCI), or in a Media Access Control Control Element (MAC CE);

wherein in a case that the first command is carried in DCI, the DCI comprises N1-bits indication information, N1 is a positive integer, the N1-bits indication information is used for indicating to deactivate the MBS service;

wherein in a case that the first command is carried in a MAC CE, the MAC CE comprises N2-bits indication information, N2 is a positive integer, and the N2-bits indication information is used for indicating to deactivate the MBS service; or, a first Logical Channel Identity (LCID) in a sub-header corresponding to the MAC CE is used for indicating to deactivate the MBS service.

10. The method of claim 8, further comprising:

sending, by the network device, MBS configuration information to the terminal device, wherein the MBS configuration information is used for determining following:

an MBS service identity;

an MBS Control Resource Set (CORESET), which is a CORESET corresponding to an MBS service;

an MBS searchspace, which is a searchspace corresponding to an MBS service;

an MBS BWP, which is a BWP corresponding to an MBS service;

a first Time Division Multiplexing (TDM) pattern configuration, which is used for determining a time of receiving an MBS service and a time of receiving a unicast service;

a first timer, which is used for determining a time to switch to an MBS BandWidth Part (BWP); and an MBS receiving time length, which is used for determining a time length for receiving an MBS service by the terminal device.

11. The method of claim 10, wherein the MBS service identity comprises at least one of following: a Temporary Mobile Group Identity (TMGI), an MBS session identity, and a Group Radio Network Temporary Identity (G-RNTI).

12. A terminal device, comprising: a processor and a memory, wherein the memory is configured to store a computer program, and the processor is configured to call and run the computer program stored in the memory to cause the terminal device to perform the following steps:
receiving a first command sent by a network device, wherein the first command is used for deactivating at least one MBS service and/or activating at least one MBS service; and
deactivating at least one MBS service and/or activating at least one MBS service based on the first command; wherein and the processor is further configured to call and run the computer program stored in the memory to cause the terminal device to perform the following steps:
for an MBS service in a deactivated state, executing following operations:
stopping monitoring a first Physical Downlink Control Channel (PDCCH), wherein the first PDCCH is a PDCCH scrambled by a Group Radio Network Temporary Identity (G-RNTI) corresponding to the MBS service;
not switching to an MBS BandWidth Part (BWP), wherein the MBS BWP is a BWP corresponding to the MBS service;
stopping a first timer, wherein the first timer is used for triggering switching of the MBS BWP; and
ignoring a first Time Division Multiplexing (TDM) pattern configuration, wherein the first TDM pattern configuration is used for triggering switching of the MBS BWP.

13. The terminal device of claim 12, wherein the first command is carried in Downlink Control Information (DCI), or in a Media Access Control Control Element (MAC CE);
wherein in a case that the first command is carried in DCI, the DCI comprises N1-bits indication information, N1 is a positive integer, the N1-bits indication information is used for indicating to deactivate the MBS service;
wherein in a case that the first command is carried in a MAC CE,
the MAC CE comprises N2-bits indication information, N2 is a positive integer, and the N2-bits indication information is used for indicating to deactivate the MBS service; or,
a first Logical Channel Identity (LCID) in a sub-header corresponding to the MAC CE is used for indicating to deactivate the MBS service.

14. The terminal device of claim 12, wherein the processor further is configured to call and run the computer program stored in the memory to cause the terminal device to perform the following steps:
stopping monitoring the first PDCCH in an MBS Control Resource Set (CORESET) and/or an MBS searchspace, wherein the MBS CORESET is a CORESET corresponding to the MBS service, and the MBS searchspace is a searchspace corresponding to the MBS service.

15. The terminal device of claim 12, wherein the processor is further configured to call and run the computer program stored in the memory to cause the terminal device to perform the following step: receiving MBS configuration information sent by the network device, and the MBS configuration information is used for determining following:
an MBS service identity;
an MBS Control Resource Set (CORESET), which is a CORESET corresponding to an MBS service;
an MBS searchspace, which is a searchspace corresponding to an MBS service;
an MBS BWP, which is a BWP corresponding to an MBS service;
a first Time Division Multiplexing (TDM) pattern configuration, which is used for determining a time of receiving an MBS service and a time of receiving a unicast service;
a first timer, which is used for determining a time to switch to an MBS BandWidth Part (BWP); and
an MBS receiving time length, which is used for determining a time length for receiving an MBS service by the terminal device.

16. The terminal device of claim 15, wherein the MBS service identity comprises at least one of following: a Temporary Mobile Group Identity (TMGI), an MBS session identity, and a Group Radio Network Temporary Identity (G-RNTI).

17. A network device, comprising: a processor and a memory, wherein the memory is configured to store a computer program, and the processor is configured to call and run the computer program stored in the memory to cause the network device to perform the following steps:
sending a first command to a terminal device, wherein the first command is used for deactivating at least one MBS service and/or activating at least one MBS service;
wherein for an MBS service in a deactivated state, the processor is further configured to call and run the computer program stored in the memory to cause the network device to enable the terminal device to perform following operations:
stopping monitoring a first Physical Downlink Control Channel (PDCCH), wherein the first PDCCH is a PDCCH scrambled by a Group Radio Network Temporary Identity (G-RNTI) corresponding to the MBS service;
not switching to an MBS BandWidth Part (BWP), wherein the MBS BWP is a BWP corresponding to the MBS service;
stopping a first timer, wherein the first timer is used for triggering switching of the MBS BWP; and
ignoring a first Time Division Multiplexing (TDM) pattern configuration, wherein the first TDM pattern configuration is used for triggering switching of the MBS BWP.

18. The network device of claim 17, wherein the first command is carried in Downlink Control Information (DCI), or in a Media Access Control Control Element (MAC CE);
wherein in a case that the first command is carried in DCI, the DCI comprises N1-bits indication information, N1 is a positive integer, the N1-bits indication information is used for indicating to deactivate the MBS service;
wherein in a case that the first command is carried in a MAC CE,
the MAC CE comprises N2-bits indication information, N2 is a positive integer, and the N2-bits indication information is used for indicating to deactivate the MBS service; or,
a first Logical Channel Identity (LCID) in a sub-header corresponding to the MAC CE is used for indicating to deactivate the MBS service.

19. The network device of claim 17, wherein the processor is further configured to call and run the computer program stored in the memory to cause the network device to perform the following step: sending MBS configuration information to the terminal device, and the MBS configuration information for determining following:
- an MBS service identity;
- an MBS Control Resource Set (CORESET), which is a CORESET corresponding to an MBS service;
- an MBS searchspace, which is a searchspace corresponding to an MBS service;
- an MBS BWP, which is a BWP corresponding to an MBS service;
- a first Time Division Multiplexing (TDM) pattern configuration, which is used for determining a time of receiving an MBS service and a time of receiving a unicast service;
- a first timer, which is used for determining a time to switch to an MBS BandWidth Part (BWP); and
- an MBS receiving time length, which is used for determining a time length for receiving an MBS service by the terminal device.

20. The network device of claim 19, wherein the MBS service identity comprises at least one of following: a Temporary Mobile Group Identity (TMGI), an MBS session identity, and a Group Radio Network Temporary Identity (G-RNTI).

\* \* \* \* \*